(12) United States Patent
Sharma et al.

(10) Patent No.: US 12,503,986 B1
(45) Date of Patent: Dec. 23, 2025

(54) DETECTING ENGINE MISFIRE EVENTS FOR VEHICLES USING FILTERING

(71) Applicant: GM GLOBAL TECHNOLOGY OPERATIONS LLC, Detroit, MI (US)

(72) Inventors: Pranjal Sharma, Troy, MI (US); Murali Mohan Kolluri, Farmington Hills, MI (US); Eric M. Staub, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/825,347

(22) Filed: Sep. 5, 2024

(51) Int. Cl.
*F02D 41/14* (2006.01)

(52) U.S. Cl.
CPC .... *F02D 41/1498* (2013.01); *F02D 2200/101* (2013.01); *F02D 2200/1015* (2013.01)

(58) Field of Classification Search
CPC ... G01L 27/007; G01L 23/226; G01L 23/227; G01M 15/11; G01M 15/12; F02D 35/027; F02D 2200/1015; F02D 41/1498; F02D 2041/1432; F02D 2041/286; F02D 29/00; F02D 2041/1433; F02D 2200/101; F02D 41/0097; F02B 77/085
See application file for complete search history.

(56) References Cited

U.S. PATENT DOCUMENTS

| | | | |
|---|---|---|---|
| 9,399,963 B2 | 7/2016 | Loucks et al. | |
| 10,139,314 B2 | 11/2018 | Hiroi et al. | |
| 11,215,529 B1 * | 1/2022 | Howard | G01M 15/06 |
| 2018/0058358 A1 * | 3/2018 | Guo | G01M 15/11 |
| 2018/0135544 A1 * | 5/2018 | Kalweit | F02D 35/024 |
| 2019/0064034 A1 * | 2/2019 | Fayfield | G05B 23/0289 |
| 2020/0318566 A1 * | 10/2020 | Carlson | F02D 13/06 |

FOREIGN PATENT DOCUMENTS

| | | | | |
|---|---|---|---|---|
| CN | 115450759 A | * | 12/2022 | F02B 77/085 |
| CN | 116677494 A | * | 9/2023 | F02B 77/08 |
| EP | 2530446 A2 | * | 12/2012 | G01L 23/227 |
| GB | 2500890 A | * | 10/2013 | F02D 41/30 |
| JP | 2005337254 A | * | 12/2005 | F23N 5/16 |

OTHER PUBLICATIONS

German Office Action for German Application No. 102024131720.5; dated Mar. 28, 2025; 5 pages.

* cited by examiner

Primary Examiner — George C Jin
Assistant Examiner — Teuta B Holbrook
(74) Attorney, Agent, or Firm — CANTOR COLBURN LLP

(57) ABSTRACT

Examples described herein provide a method that includes calculating an engine speed based at least in part on a crank sensor signal received from a crank sensor of the engine at periodic intervals defined by a crank rotation. The method further includes calculating an engine acceleration based at least in part on the engine speed. The method further includes generating, using a filter, a filtered engine acceleration for the periodic intervals based at least in part on the engine acceleration. The method further includes calculating a root mean square (RMS) engine acceleration based at least in part on the filtered engine acceleration for the periodic intervals. The method further includes detecting an engine misfire event based at least in part on the RMS engine acceleration. The method further includes implementing a corrective action for the vehicle in response to detecting the engine misfire event.

20 Claims, 4 Drawing Sheets

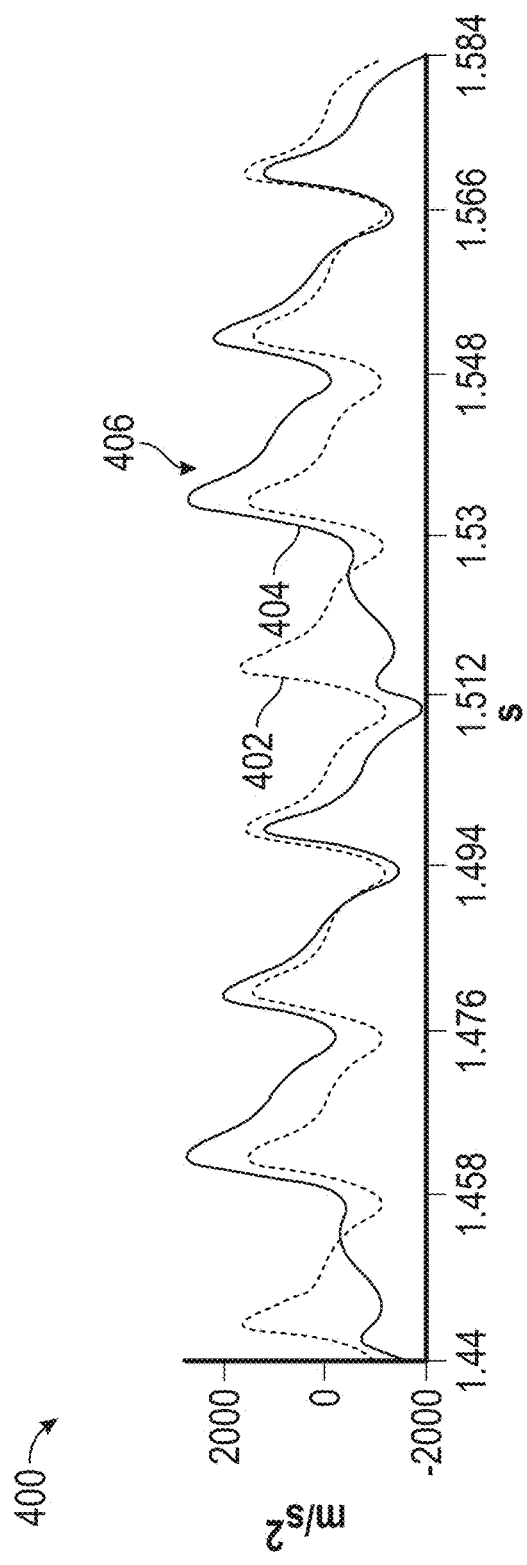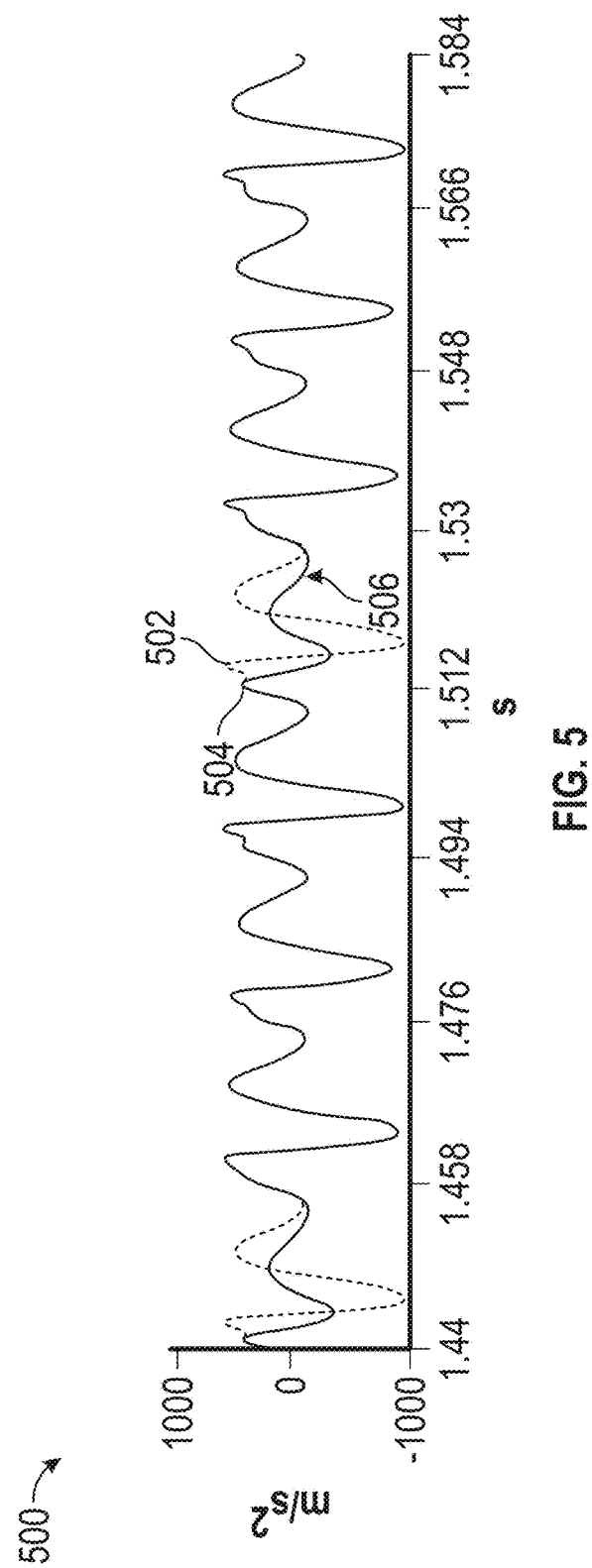

DETECTING ENGINE MISFIRE EVENTS FOR VEHICLES USING FILTERING

BACKGROUND

The subject disclosure relates to vehicles, and in particular to detecting engine misfire events for vehicles using filtering.

Modern vehicles (e.g., a car, a motorcycle, a boat, or any other type of automobile) may be equipped with an engine, such as an internal combustion engine (ICE). During operation, an ICE fires on a regular, periodic basis. However, in some situations, misfire events can occur.

An engine misfire event occurs when one or more cylinders in an ICE fails to ignite the air-fuel mixture at the proper time. This can lead to a variety of issues, including reduced engine performance, increased emissions, and potential damage to engine components. Misfire events can be caused by a range of factors, such as faulty spark plugs, fuel delivery problems, or issues with the engine's ignition system. Detecting engine misfire events accurately and promptly is useful for maintaining engine health and performance.

SUMMARY

In one embodiment, a method for detecting engine misfire events for vehicles using filtering is provided. The method includes calculating an engine speed based at least in part on a crank sensor signal received from a crank sensor of the engine at periodic intervals defined by a crank rotation. The method further includes calculating an engine acceleration based at least in part on the engine speed. The method further includes generating, using a filter, a filtered engine acceleration for the periodic intervals based at least in part on the engine acceleration. The method further includes calculating a root mean square (RMS) engine acceleration based at least in part on the filtered engine acceleration for the periodic intervals. The method further includes detecting an engine misfire event based at least in part on the RMS engine acceleration. The method further includes implementing a corrective action for the vehicle in response to detecting the engine misfire event.

In addition to one or more of the features described herein, or as an alternative, further embodiments of the method may include that the filter is a high pass filter.

In addition to one or more of the features described herein, or as an alternative, further embodiments of the method may include that the filter is a Butterworth filter.

In addition to one or more of the features described herein, or as an alternative, further embodiments of the method may include that detecting the engine misfire event comprises comparing the RMS engine acceleration to a normal fire value.

In addition to one or more of the features described herein, or as an alternative, further embodiments of the method may include that the engine misfire event is detected responsive to the RMS engine acceleration being greater than four standard deviations from the normal fire value.

In addition to one or more of the features described herein, or as an alternative, further embodiments of the method may include that generating the filtered engine acceleration is performed using a convolution.

In addition to one or more of the features described herein, or as an alternative, further embodiments of the method may include that the convolution is defined by the following equation:

$$\frac{y}{x} = \frac{B_0 + B_1 z^{-1} + B_2 z^{-2} + \ldots + B_N z^{-N}}{A_0 + A_1 z^{-1} + A_2 z^{-2} + \ldots + A_M z^{-M}}$$

where $A_0 \ldots A_M$ and $B_0 \ldots B_N$ are coefficients that are precalculated for the filter, M and N are integers, and y and x refer to filtered and unfiltered acceleration, respectively.

In addition to one or more of the features described herein, or as an alternative, further embodiments of the method may include that the RMS engine acceleration is calculated using the following equation:

$$\mathrm{mod}\left(\frac{B_0 a_k + B_1 a_k + B_2 a_{k-2} + B_3 a_{k-3} + A_1 a'_{k-1} + A_2 a'_{k-2} + A_3 a'_{k-3}}{a_0}, \mathrm{crank\ rotation}\right)$$

where $A_0 \ldots A_M$ and $B_0 \ldots B_N$ are coefficients that are precalculated for the filter, M and N are integers, $a_k$, $a_{k-1}$, $a_{k-2}$, $a_{k-3}$ are unfiltered acceleration for a current sample and three prior samples, $a'_k$, $a'_{k-1}$, $a'_{k-2}$, $a'_{k-3}$ are filtered acceleration for the current sample and the three prior samples, and k represents an amount of the crank rotation in degrees.

In another embodiment, a vehicle is provided. The vehicle includes an internal combustion engine, a crank shaft associated with the internal combustion engine, and a processing system. The processing system includes a memory having computer readable instructions. The processing system also includes a processing device for executing the computer readable instructions, the computer readable instructions controlling the processing system to perform operations for detecting engine misfire events for the internal combustion engine. The operations include calculating an engine speed of the internal combustion engine based at least in part on a crank sensor signal received from the crank sensor at periodic intervals defined by a crank rotation. The operations further include calculating an engine acceleration of the internal combustion engine based at least in part on the engine speed. The operations further include generating, using a filter, a filtered engine acceleration of the internal combustion engine for the periodic intervals based at least in part on the engine acceleration. The operations further include calculating a root mean square (RMS) engine acceleration of the internal combustion engine based at least in part on the filtered engine acceleration for the periodic intervals. The operations further include detecting an engine misfire event of the internal combustion engine based at least in part on the RMS engine acceleration. The operations further include implementing a corrective action for the vehicle in response to detecting the engine misfire event.

In addition to one or more of the features described herein, or as an alternative, further embodiments of the vehicle may include that the filter is a high pass filter.

In addition to one or more of the features described herein, or as an alternative, further embodiments of the vehicle may include that the filter is a Butterworth filter.

In addition to one or more of the features described herein, or as an alternative, further embodiments of the vehicle may include that detecting the engine misfire event comprises comparing the RMS engine acceleration to a normal fire value.

In addition to one or more of the features described herein, or as an alternative, further embodiments of the vehicle may include that the engine misfire event is detected responsive to the RMS engine acceleration being greater than four standard deviations from the normal fire value.

In addition to one or more of the features described herein, or as an alternative, further embodiments of the vehicle may include that generating the filtered engine acceleration is performed using a convolution.

In addition to one or more of the features described herein, or as an alternative, further embodiments of the vehicle may include that the convolution is defined by the following equation:

$$\frac{y}{x} = \frac{B_0 + B_1 z^{-1} + B_2 z^{-2} + \ldots + B_N z^{-N}}{A_0 + A_1 z^{-1} + A_2 z^{-2} + \ldots + A_M z^{-M}}$$

where $A_0 \ldots A_M$ and $B_0 \ldots B_N$ are coefficients that are precalculated for the filter, M and N are integers, and y and x refer to filtered and unfiltered acceleration, respectively.

In addition to one or more of the features described herein, or as an alternative, further embodiments of the vehicle may include that the RMS engine acceleration is calculated using the following equation:

$$\mathrm{mod}\left(\frac{B_0 a_k + B_1 a_k + B_2 a_{k-2} + B_3 a_{k-3} + A_1 a'_{k-1} + A_2 a'_{k-2} + A_3 a'_{k-3}}{a_0}, \text{crank rotation}\right)$$

where $A_0 \ldots A_M$ and $B_0 \ldots B_N$ are coefficients that are precalculated for the filter, M and N are integers, $a_k$, $a_{k-1}$, $a_{k-2}$, $a_{k-3}$ are unfiltered acceleration for a current sample and three prior samples, $a'_k$, $a'_{k-1}$, $a'_{k-2}$, $a'_{k-3}$ are filtered acceleration for the current sample and the three prior samples, and k represents an amount of the crank rotation in degrees.

In another embodiment a computer program product is provided. The computer program product includes a computer readable storage medium having program instructions embodied therewith, the program instructions executable by at least one processor to cause the at least one processor to perform operations for detecting engine misfire events for an engine of a vehicle. The operations include calculating an engine speed based at least in part on a crank sensor signal received from a crank sensor of the engine at periodic intervals defined by a crank rotation. The operations further include calculating an engine acceleration based at least in part on the engine speed. The operations further include generating, using a filter, a filtered engine acceleration for the periodic intervals based at least in part on the engine acceleration. The operations further include calculating a root mean square (RMS) engine acceleration based at least in part on the filtered engine acceleration for the periodic intervals. The operations further include detecting an engine misfire event based at least in part on the RMS engine acceleration. The operations further include implementing a corrective action for the vehicle in response to detecting the engine misfire event.

In addition to one or more of the features described herein, or as an alternative, further embodiments of the computer program product may include that detecting the engine misfire event comprises comparing the RMS engine acceleration to a normal fire value, wherein the engine misfire event is detected responsive to the RMS engine acceleration being greater than four standard deviations from the normal fire value.

In addition to one or more of the features described herein, or as an alternative, further embodiments of the computer program product may include that generating the filtered engine acceleration is performed using a convolution defined by the following equation:

$$\frac{y}{x} = \frac{B_0 + B_1 z^{-1} + B_2 z^{-2} + \ldots + B_N z^{-N}}{A_0 + A_1 z^{-1} + A_2 z^{-2} + \ldots + A_M z^{-M}}$$

where $A_0 \ldots A_M$ and $B_0 \ldots B_N$ are coefficients that are precalculated for the filter, M and N are integers, and y and x refer to filtered and unfiltered acceleration, respectively.

In addition to one or more of the features described herein, or as an alternative, further embodiments of the computer program product may include that the RMS engine acceleration is calculated using the following equation:

$$\mathrm{mod}\left(\frac{B_0 a_k + B_1 a_k + B_2 a_{k-2} + B_3 a_{k-3} + A_1 a'_{k-1} + A_2 a'_{k-2} + A_3 a'_{k-3}}{a_0}, \text{crank rotation}\right)$$

where $A_0 \ldots A_M$ and $B_0 \ldots B_N$ are coefficients that are precalculated for the filter, M and N are integers, $a_k$, $a_{k-1}$, $a_{k-2}$, $a_{k-3}$ are unfiltered acceleration for a current sample and three prior samples, $a'_k$, $a'_{k-1}$, $a'_{k-2}$, $a'_{k-3}$ are filtered acceleration for the current sample and the three prior samples, and k represents an amount of the crank rotation in degrees.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 is a graph of actual acceleration signals for fire and misfire events according to one or more embodiments;

FIG. 5 is a graph of filtered acceleration signals for fire and misfire events according to one or more embodiments.

DETAILED DESCRIPTION

Figure 1:
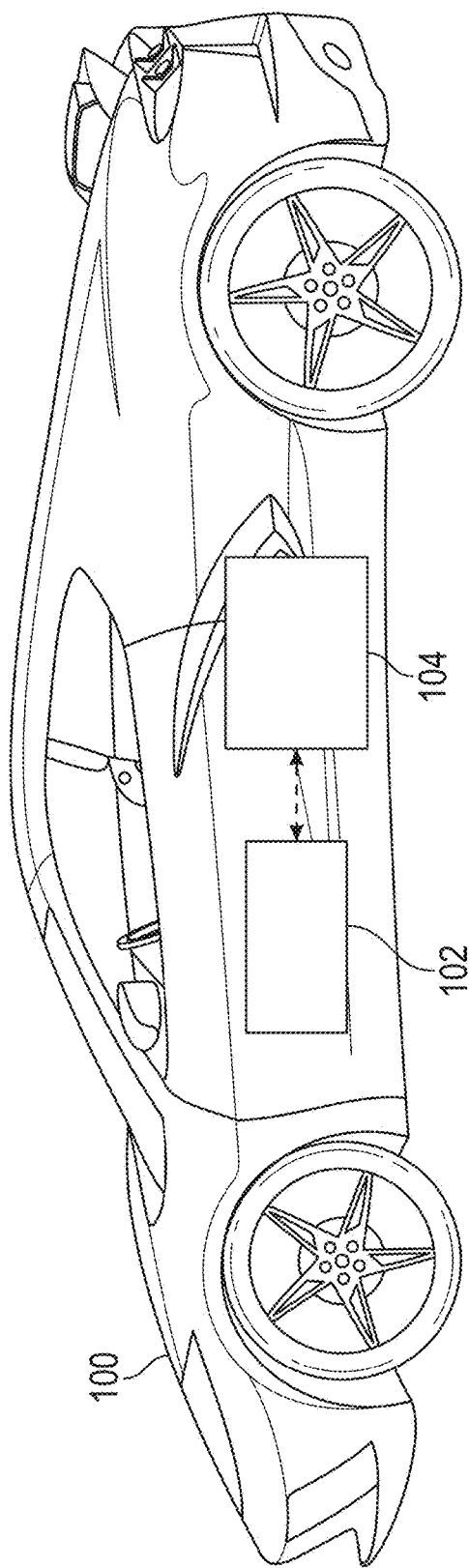
FIG. 1 is an illustration of a vehicle having a processing system and an internal combustion engine according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein relates to detecting engine misfire events for vehicles using filtering.

Detecting engine misfire events accurately and promptly is useful for maintaining engine health and performance. Some approaches for detecting misfire events rely on monitoring engine speed and acceleration. However, these approaches can be less effective at certain engine speeds and loads, particularly in the presence of resonance effects caused by the engine's damper system. These resonance effects can mask the true engine behavior, making it difficult to distinguish between normal operation and misfire events.

Some vehicles, such as plug-in hybrid electric vehicles (PHEVs) lack torque converters or implement locked torque converter clutches. In such configurations, existing approaches to detecting misfire events struggle to effectively detect misfire events under these conditions, leading to potential performance and reliability issues.

Traditional detection approaches often fail to account for the damper torque effect on operational torque at resonance. This limitation results in inaccurate detection of engine misfires, especially in scenarios involving low order resonance and high operational variation. There is a need for a more effective method to detect operational anomalies that can operate reliably across varying speeds and conditions, and where torque converters are absent or locked torque converter clutches are used, ensuring accurate detection and improved vehicle performance.

Detecting engine misfire events accurately and promptly is useful for maintaining engine health and performance. To address these challenges, advanced detection approaches are desired that can filter out the noise caused by resonance and other factors, providing a clearer and more accurate indication of engine misfire events. Such approaches improve the reliability of misfire detection, leading to better engine performance, reduced emissions, and lower maintenance costs.

One or more embodiments described herein addresses these challenges by introducing a new approach to detect engine misfire events. For example, one or more embodiments utilizes a high pass filter applied to engine acceleration to mitigate resonance and combustion randomness effects. The high pass filter uses a discrete order filter that remains invariant with engine speeds. The root mean square (RMS) engine acceleration for combustion-to-combustion events is calculated using the filtered acceleration. This approach provides a more effective approach to detecting misfire events, particularly in conditions involving low order resonance and high combustion variation and/or where torque converters are absent or locked torque converter clutches are used.

FIG. 1 shows a vehicle 100 with a processing system 102 and an internal combustion engine (ICE) 104 according to one or more embodiments.

The vehicle 100 can be a car, a truck, a van, a bus, a motorcycle, a boat, or any other type of automobile. According to an embodiment, the vehicle 100 includes the ICE 104, which is fueled by gasoline, diesel, or the like. According to another embodiment, the vehicle 100 is a hybrid electric vehicle, such as a plug-in hybrid electric vehicle (PHEV) partially or wholly powered by electrical power. According to one or more embodiments, the vehicle 100 is an autonomous or semi-autonomous vehicle. An autonomous vehicle is a vehicle that has self-driving capabilities. A semi-autonomous vehicle is a vehicle that has certain autonomous features (e.g., self-parking, lane keeping, etc.) but lacks full autonomous control.

The processing system 102 communicates with the ICE 104 to monitor and control various engine parameters. According to one or more embodiments, the processing system 102 is an engine control unit (ECU). The processing system 102 is responsible for executing various control algorithms and processing data received from different sensors, such as a crank sensor (see FIG. 2). According to one or more embodiments, the processing system 102 is integrated into the architecture of the vehicle 100 to provide seamless communication with other components.

The ICE 104 (also referred to as simply "engine") is a component of the vehicle 100 responsible for generating power through the combustion of fuel. The ICE 104 operates in conjunction with the processing system 102 to ensure optimal performance and efficiency. The ICE 104 includes various subsystems and sensors that provide real-time signals/data to the processing system 102 for analysis and control.

Further features of the processing system 102 are now described with reference to FIGS. 2-5.

Figure 2:
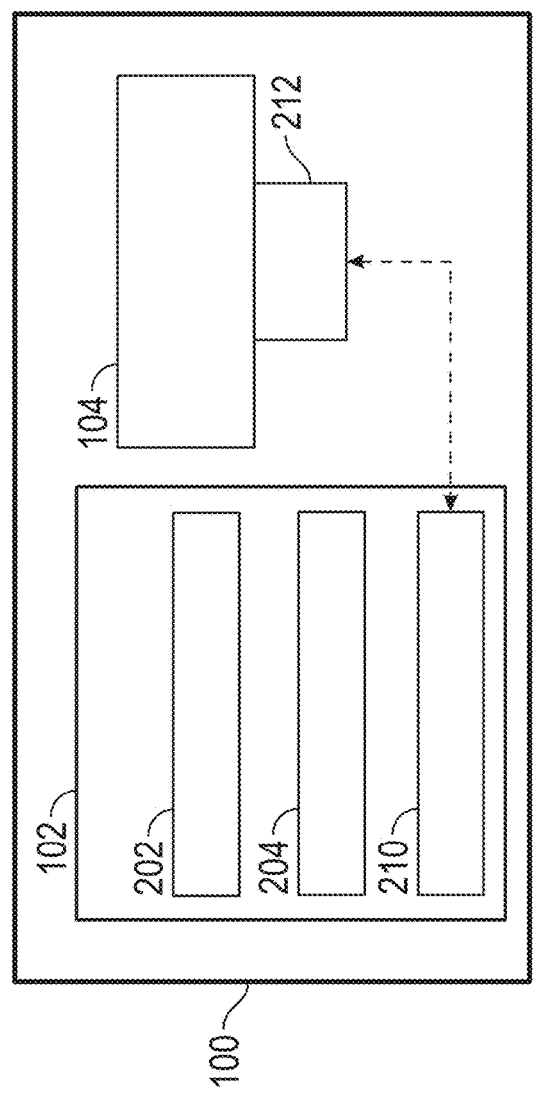
FIG. 2 is a block diagram of the processing system of FIG. 1 according to one or more embodiments.

Particularly, FIG. 2 is a block diagram of the processing system 102 of FIG. 1 according to one or more embodiments. According to one or more embodiments, the processing system 102 includes a processing device 202, a memory 204, and a misfire detection engine 210. It should be appreciated that the processing system 102 can be any device suitable for detecting engine misfire. For example, the processing system 102 can be a device implemented in or otherwise associated with the vehicle 100. As another example, the processing system 102 can be a smartphone, tablet computer, laptop computer, desktop computer, wearable computing device, and/or the like, including combinations and/or multiples thereof. As yet another example, the processing system 102 can be the processing system 600 of FIG. 6 and/or can include one or more components of the processing system 600 of FIG. 6.

The processing device 202 within the processing system 102 handles the computational tasks for engine control and misfire detection. The processing device 202 processes data from various sensors, such as a crank sensor 212, and executes algorithms to monitor engine performance of the ICE 104. The processing device 202 is any suitable processing circuitry for processing and/or instructions. The processing device 202 is an example of one or more of the processing devices 621 of FIG. 6, as described in more detail herein.

The memory 204 stores the data and algorithms for the operation of the processing system 102. The memory 204 provides storage for real-time data processing and historical data analysis. The memory 204 is any suitable device for storing data and/or instructions. The memory 204 is an example of one or more of the system memory 622, the random access memory 623, and/or the read-only memory 624 of FIG. 6, as described in more detail herein.

The misfire detection engine 210 is a specialized component within the processing system 102 designed to detect engine misfire events. The misfire detection engine 210 analyzes signals and/or data from the crank sensor 212 and other engine parameters to detect misfire events. Features and functionality of the misfire detection engine 210 are now described in more detail with reference to FIGS. 3-5.

As described herein, the ICE 104 generates power through the combustion of fuel and operates in conjunction with the processing system 102 to provide optimal performance and efficiency. The ICE 104 includes various subsystems and sensors, such as the crank sensor 212, that provide real-time signals/data to the processing system 102 for analysis and control.

The crank sensor 212 is a component of the ICE 104 that provides real-time information (e.g., signals or data) about a position and a speed of a crankshaft of the ICE 104. For example, the crank sensor 212 sends signals to the processing system 102, which are used by the misfire detection engine 210 to detect misfire events.

Figure 3:
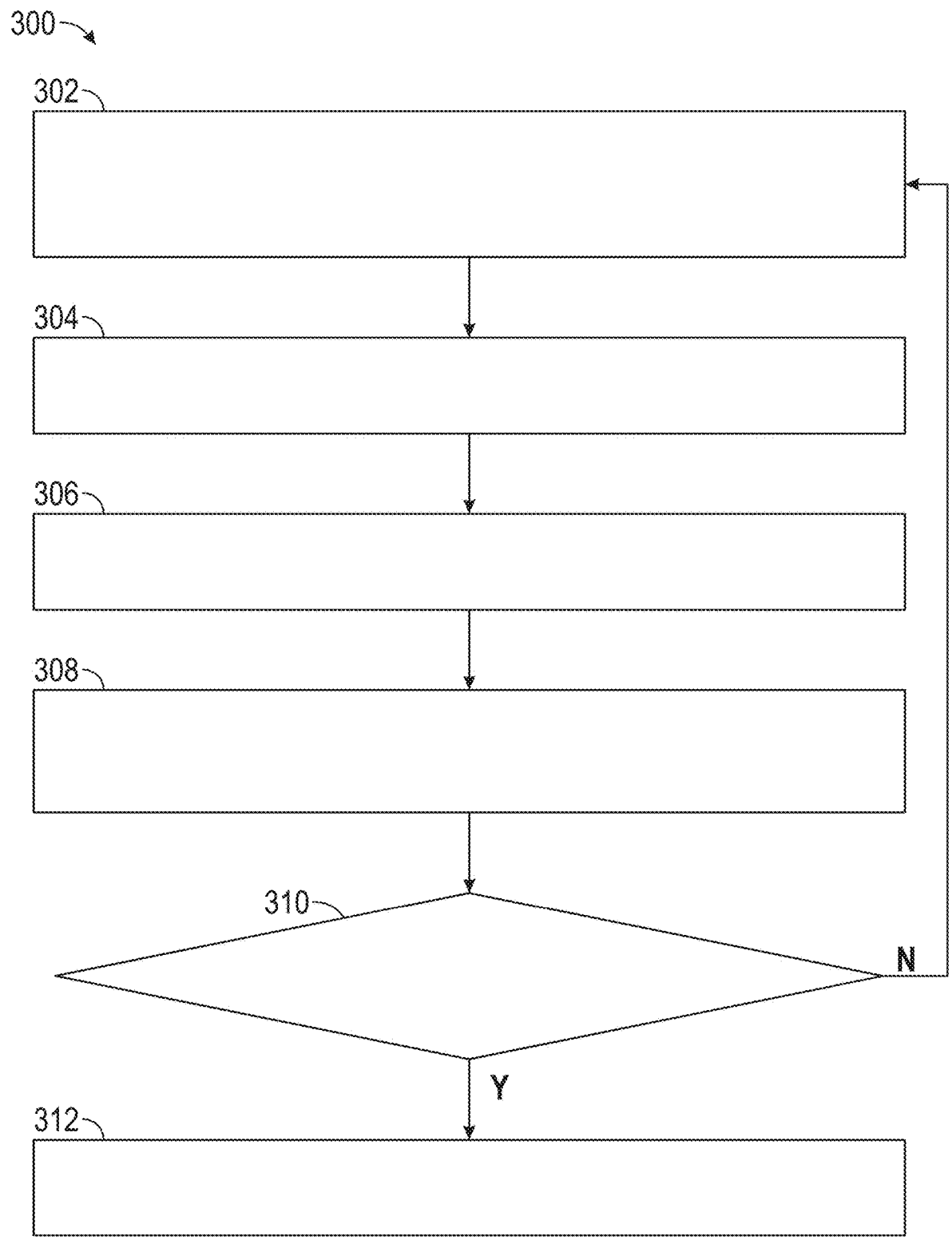
FIG. 3 is a flow diagram of a method for detecting engine misfire events for vehicles using filtering according to one or more embodiments.

FIG. 3 is a flow diagram of a method 300 for detecting engine misfire events for engines (e.g., the ICE 104) of vehicles (e.g., the vehicle 100) according to one or more embodiments. For example, the method 300 detects engine misfire events for the ICE 104 using filtered engine acceleration and RMS engine acceleration. The method 300 includes several components and steps that work together to achieve accurate misfire detection. The method 300 can be implemented using any suitable system or device. For example, the method 300 can be implemented using the processing system 102 of FIGS. 1 and 2, by the processing system 600 of FIG. 6, and/or the like, including combinations and/or multiples thereof. The method 300 is now described with reference to FIGS. 1, 2, 4, and/or 5 but is not so limited.

The method 300 begins at block 302, where the misfire detection engine 210 calculates engine speed based at least in part on a crank sensor signal received from the crank sensor 212 of the ICE 104 at periodic intervals defined by a crank rotation. This step involves using the crank sensor signal to determine the engine speed. The crank sensor provides real-time data on the crankshaft's position and speed, which are used for calculating the engine speed accurately. The processing system 102 receives the crank sensor signal from the crank sensor 212 at periodic intervals defined by the crank rotation, ensuring precise timing for speed calculation. For example, the crank rotation may be 6 crank degrees, in which case the crank sensor signal is received every 6 crank degrees (e.g., 60 times per rotation of the crank shaft). According to one or more embodiments, a crank sensor implements a 58× sensing design, meaning that it has 58 teeth every 6 degrees with a gap of two teeth. A crank sensing design with a gap of "X" teeth can be implemented in various embodiments. It should be appreciated that other values for the crank rotation may be implemented in other embodiments.

At block 304, the misfire detection engine 210 calculates engine acceleration based at least in part on the engine speed from block 302. This step involves using the previously calculated engine speed to determine the engine acceleration. The misfire detection engine 210 calculates the engine acceleration by analyzing the changes in engine speed over time for the periodic interval defined by the crank rotation. According to one or more embodiments, the misfire detection engine 210 calculates the engine acceleration using the following equation:

$$\text{engine acceleration} = \frac{\omega_n - \omega_{n-1}}{\text{periodic interval}}$$

where $\omega_n$ is the engine speed for a current time n, $\omega_{n-1}$ is the engine speed for a previous time n−1, and the periodic interval is defined by the crank rotation. According to one or more embodiments, generating the filtered engine acceleration is performed using a convolution defined by the following equation:

$$\frac{y}{x} = \frac{B_0 + B_1 z^{-1} + B_2 z^{-2} + \ldots + B_N z^{-N}}{A_0 + A_1 z^{-1} + A_2 z^{-2} + \ldots + A_M z^{-M}}$$

where $A_0 \ldots A_M$ and $B_0 \ldots B_N$ are coefficients that are precalculated for the filter, M and N are integers, and y and x refer to filtered and unfiltered acceleration, respectively. This calculation is useful for understanding the engine's dynamic behavior and identifying any irregularities that may indicate a misfire event.

At block 306, the misfire detection engine 210 generates, using a filter, a filtered engine acceleration for the periodic intervals based at least in part on the engine acceleration from block 304. This step involves applying a filter (e.g., a high pass filter, a Butterworth filter, a low pass filter, a bandwidth filter, and/or the like, including combinations and/or multiples thereof) to the calculated engine acceleration to remove noise and other unwanted signals. According to one or more embodiments, the filter is a high pass filter or a Butterworth filter. The high pass filter is designed to filter out low-frequency components, while the Butterworth filter provides a smooth frequency response. According to one or more embodiments, the filter can be optimized to maximize signal to noise ratio. The filtered engine acceleration is generated by performing a convolution using the unfiltered engine acceleration with the filter, ensuring that the resulting signal is free from resonance effects and other distortions.

At block 308, the misfire detection engine 210 calculates a root mean square (RMS) engine acceleration based at least in part on the filtered engine acceleration for the periodic intervals from block 306. This step involves computing the RMS value of the filtered engine acceleration, which provides a measure of the engine's overall acceleration behavior. According to one or more embodiments, the RMS engine acceleration is calculated using the following equation:

$$\text{mod}\left(\frac{B_0 a_k + B_1 a_k + B_2 a_{k-2} + B_3 a_{k-3} + A_1 a'_{k-1} + A_2 a'_{k-2} + A_3 a'_{k-3}}{a_0}, \text{crank rotation}\right)$$

where $A_0 \ldots A_M$ and $B_0 \ldots B_N$ are coefficients that are precalculated for the filter, M and N are integers, $a_k$, $a_{k-1}$, $a_{k-2}$, $a_{k-3}$ are unfiltered acceleration for a current sample and three prior samples, $a'_k$, $a'_{k-1}$, $a'_{k-2}$, $a'_{k-3}$ are filtered acceleration for the current sample and the three prior samples, and k represents an amount of the crank rotation in degrees. This calculation helps in identifying any significant deviations from engine operation, which may indicate a misfire event.

At block 310, the misfire detection engine 210 detects whether an engine misfire event occurred based at least in part on the RMS engine acceleration from block 308. This step involves comparing the RMS engine acceleration to a normal fire value to determine if a misfire event has occurred. If the RMS engine acceleration differs from the normal fire value by a threshold amount (e.g., a certain percentage, a certain value, and/or the like, including combinations and/or multiples thereof), a misfire event is considered to have occurred. According to one or more embodiments, the engine misfire event is detected responsive to the RMS engine acceleration being greater than four standard deviations from the fire value. This comparison helps in distinguishing between nominal engine operation and misfire events, ensuring accurate detection.

At block 312, responsive to detecting an engine misfire event (block 310 "Yes"), the misfire detection engine 210 causes a corrective action to be implemented for the vehicle 100. Upon detecting an engine misfire event, several corrective actions can be taken to mitigate the impact and ensure the vehicle continues to operate safely and efficiently. These corrective actions may include one or more of the following:

Adjusting Fuel Injection Timing: The processing system 102 (e.g., an engine control unit) can modify the timing of fuel injection to ensure that the air-fuel mixture is ignited at the optimal moment. This adjustment can help restore normal combustion and prevent further misfires.

Ignition System Adjustment: The processing system 102 can adjust the ignition timing or increase the spark energy to ensure that the spark plug ignites the air-fuel mixture effectively. This can help resolve issues related to weak or delayed ignition.

Cylinder Deactivation: In cases where a specific cylinder is consistently misfiring, the processing system 102 can temporarily deactivate that cylinder to prevent further damage to the engine. This allows the vehicle 100 to continue operating with reduced power until the issue can be addressed.

Fuel System Inspection: The processing system 102 can trigger a diagnostic routine to inspect the fuel delivery system for issues such as clogged fuel injectors or low fuel pressure. If a problem is detected, the processing system 102 can attempt to compensate by adjusting fuel delivery parameters.

Engine Load Reduction: The processing system 102 can reduce the engine load by limiting the throttle opening or adjusting the transmission shift points. This can help minimize the stress on the engine and prevent further misfires while allowing the vehicle to continue operating.

Logging Diagnostic Data: The processing system 102 can log detailed diagnostic data related to the misfire event, including engine speed, acceleration, and sensor readings. This data can be used by technicians to diagnose and repair the root cause of the misfire event more effectively.

Adaptive Learning: The processing system 102 can use adaptive learning algorithms to adjust engine parameters based on the detected misfire event. Over time, adaptive learning can help the engine adapt to changing conditions and prevent future misfires.

According to one or more embodiments, in addition to or instead of performing the corrective action, the processing system 102 can alert an operator of the vehicle 100 of the misfire event, such as by activate a warning light on the vehicle's dashboard or emitting an audible tone and/or message. This alert can prompt the driver to seek maintenance or repair services to address the underlying issue causing the engine misfire event.

By implementing one or more of these corrective actions, the processing system 102 can more effectively and efficiently manage engine misfire events, ensuring continued desirable and efficient vehicle operation while minimizing the risk of damage to engine components.

If no misfire event is detected (block 310 "No"), the method 300 may return to block 302 and repeat.

Additional processes also may be included, and it should be understood that the processes depicted in FIG. 3 represent illustrations, and that other processes may be added, or existing processes may be removed, modified, or rearranged without departing from the scope of the present disclosure. It should also be understood that the processes depicted in FIG. 3 may be implemented as programmatic instructions stored on a non-transitory computer-readable storage medium that, when executed by a processor (e.g., the processing device 202 of FIG. 2, the processor(s) 621 of FIG. 6, and/or the like, including combinations and/or multiples thereof) of a computing system (e.g., the processing system 102 of FIGS. 1 and 2, the processing system 1100 of FIG. 6, and/or the like, including combinations and/or multiples thereof), cause the processor to perform the processes described herein.

FIG. 4 shows a graph 400 of actual acceleration signals for normal fire and single cylinder misfire events. The graph 400 includes an actual acceleration signal 402 for a normal fire event and an actual acceleration signal 404 for a single cylinder misfire event, which are plotted in terms of acceleration (meters/second$^2$) (vertical axis) over time (seconds) (horizontal axis). The graph 400 illustrates the differences in acceleration signals between normal fire and misfire events, highlighting the variations in engine behavior during these conditions.

The actual acceleration signal 402 represents the engine's acceleration during a normal fire event. This signal serves as a baseline for comparing the engine's performance under normal (non-misfire) operating conditions. The actual acceleration signal 402 is characterized by a substantially consistent pattern that reflects the engine's regular combustion cycles.

The actual acceleration signal 404 represents the engine's acceleration during a single cylinder misfire event. This signal shows deviations from the pattern observed in the actual acceleration signal 402. The variations in the actual acceleration signal 404 indicate irregularities in the engine's combustion process, which are indicative of a misfire event 406.

FIG. 5 shows a graph 500 of filtered acceleration signals for normal fire and single cylinder misfire events. The graph 500 includes a filtered acceleration signal 502 for a normal fire event and a filtered acceleration signal 504 for a single cylinder misfire event, which are plotted in terms of acceleration (meters/second$^2$) (vertical axis) over time (seconds) (horizontal axis). The graph 500 demonstrates the effectiveness of the filtering process in isolating the relevant acceleration signals for accurate misfire detection.

The filtered acceleration signal 502 represents the engine's acceleration during a normal fire event after applying the filter as described herein. The filtered acceleration signal 502 provides a clearer and more consistent representation of the engine's performance as compared to the actual acceleration signal 402 of FIG. 4, free from noise and other distortions. This filtered signal serves as a reference for identifying deviations in engine behavior.

The filtered acceleration signal 504 represents the engine's acceleration during a single cylinder misfire event after applying the filter as described herein. This signal highlights the differences between engine operation and misfire events more distinctly than the actual acceleration signals as can be observed by comparing the graphs 400 and 500. The filtered acceleration signal 504 shows significant deviations from the filtered acceleration signal 502, indicating the presence of a misfire event 506.

Figure 6:
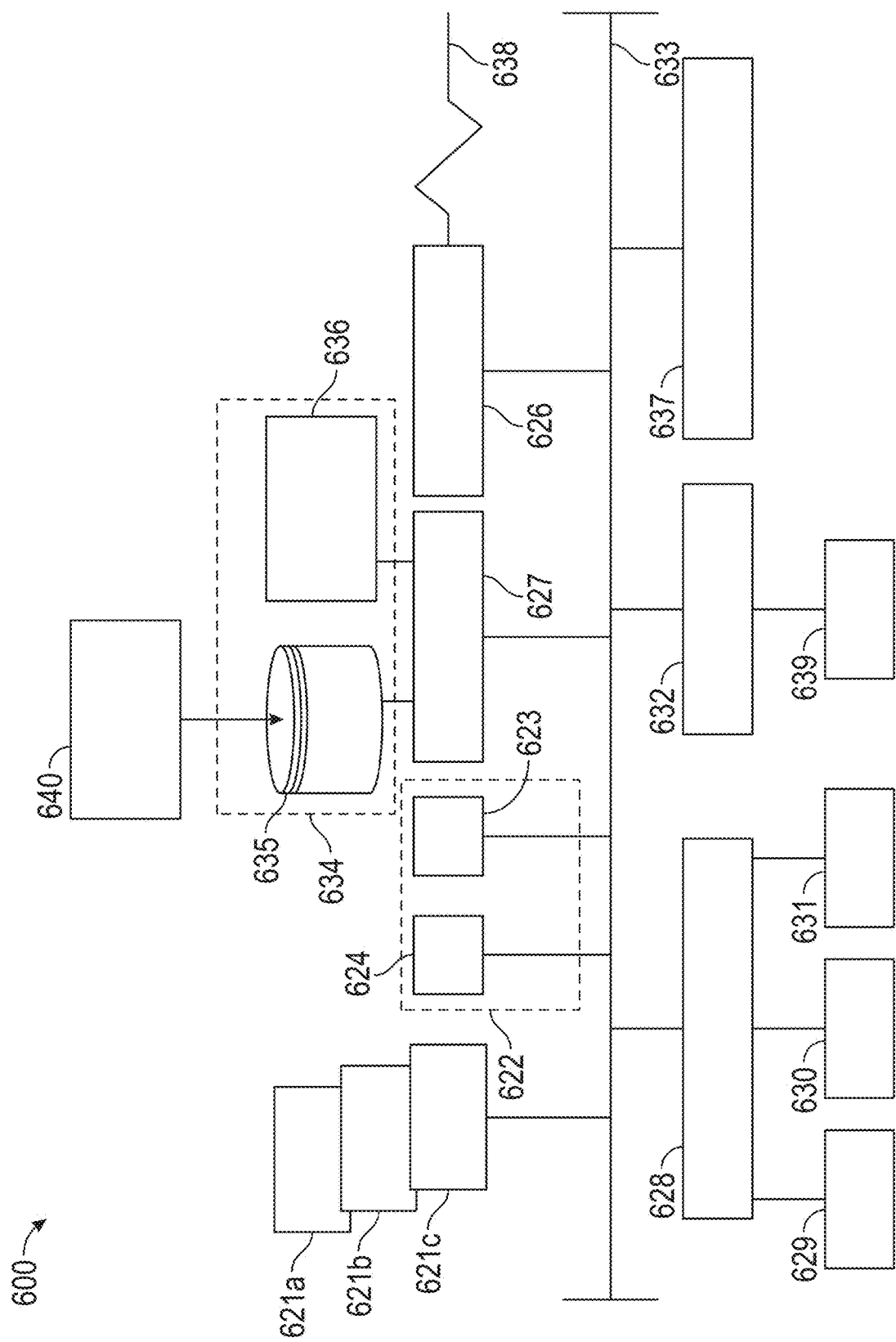
FIG. 6 is a block diagram of a processing system for implementing one or more embodiments described herein.

It is understood that one or more embodiments described herein is capable of being implemented in conjunction with any other type of computing environment now known or later developed. For example, FIG. 6 depicts a block diagram of a processing system 600 for implementing the techniques described herein. In accordance with one or more embodiments described herein, the processing system 600 is an example of a cloud computing node of a cloud computing environment. In examples, processing system 600 has one or more central processing units (referred to also as "processors" or "processing resources" or "processing devices") 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to a system memory 622 and/or various other components via a system bus 633. The system memory 622 can include one or more temporary and/or persistent memory devices, such as a random access memory (RAM) 623, a read-only memory (ROM) 624, and/or the like, including combinations and/or multiples thereof. The system bus 633 may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 635 and/or a storage device 636 or any other similar component. I/O adapter 627, hard disk 635, and storage device 636 are collectively referred to herein as mass storage 634. Operating system 640 for execution on processing system 600 may be stored in mass storage 634. The network adapter 626 interconnects system bus 633 with an outside network 638 enabling processing system 600 to communicate with other such systems.

A display (e.g., a display monitor) 639 is connected to system bus 633 by display adapter 632, which may include a graphics adapter to improve the performance of graphics intensive applications and a video controller. In one aspect of the present disclosure, adapters 626, 627, and/or 632 may be connected to one or more I/O buses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit (GPU) 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including the system memory 622 and mass storage 634, input means such as keyboard 629 and mouse 630, and output capability including speaker 631 and display 639. In some aspects of the present disclosure, a portion of system memory 622 and mass storage 634 collectively store the operating system 640 to coordinate the functions of the various components shown in processing system 600.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for detecting engine misfire events for an engine of a vehicle, the method comprising:
    calculating an engine speed based at least in part on a crank sensor signal received from a crank sensor of the engine at periodic intervals defined by a crank rotation;
    calculating an engine acceleration based at least in part on the engine speed;
    generating, using a filter, a filtered engine acceleration for the periodic intervals based at least in part on the engine acceleration, wherein generating the filtered engine acceleration is performed using a convolution defined by the following equation:

$$\frac{y}{x} = \frac{B_0 + B_1 z^{-1} + B_2 z^{-2} + \ldots + B_N z^{-N}}{A_0 + A_1 z^{-1} + A_2 z^{-2} + \ldots + A_M z^{-M}}$$

where $A_0 \ldots A_M$ and $B_0 \ldots B_N$ are coefficients that are precalculated for the filter, M and N are integers, and y and x refer to filtered and unfiltered acceleration, respectively;
    calculating a root mean square (RMS) engine acceleration based at least in part on the filtered engine acceleration for the periodic intervals;

detecting an engine misfire event based at least in part on the RMS engine acceleration; and implementing a corrective action for the vehicle in response to detecting the engine misfire event.

2. The computer-implemented method of claim 1, wherein the filter is a high pass filter.

3. The computer-implemented method of claim 1, wherein the filter is a Butterworth filter.

4. The computer-implemented method of claim 1, wherein detecting the engine misfire event comprises comparing the RMS engine acceleration to a normal fire value.

5. The computer-implemented method of claim 4, wherein the engine misfire event is detected responsive to the RMS engine acceleration being greater than four standard deviations from the normal fire value.

6. The computer-implemented method claim 1, wherein the RMS engine acceleration is calculated using the following equation:

$$\text{mod}\left(\frac{B_0 a_k + B_1 a_k + B_2 a_{k-2} + B_3 a_{k-3} + A_1 a'_{k-1} + A_2 a'_{k-2} + A_3 a'_{k-3}}{a_0}, \text{crank rotation}\right)$$

where $A_0 \ldots A_M$ and $B_0 \ldots B_N$ are coefficients that are precalculated for the filter, M and N are integers, $a_k$, $a_{k-1}$, $a_{k-2}$, $a_{k-3}$ are unfiltered acceleration for a current sample and three prior samples, $a'_k$, $a'_{k-1}$, $a'_{k-2}$, $a'_{k-3}$ are filtered acceleration for the current sample and the three prior samples, and k represents an amount of the crank rotation in degrees.

7. The computer-implemented method of claim 1, wherein the engine speed is an engine speed for a current time, and wherein the engine acceleration is calculated based on the engine speed for the current time, an engine speed for a previous time, and a periodic interval defined by the crank rotation.

8. A vehicle comprising:
an internal combustion engine;
a crank sensor associated with the internal combustion engine; and
a processing system comprising:
  a memory comprising computer readable instructions; and
  a processing device for executing the computer readable instructions, the computer readable instructions controlling the processing system to perform operations for detecting engine misfire events for the internal combustion engine, the operations comprising:
    calculating an engine speed of the internal combustion engine based at least in part on a crank sensor signal received from the crank sensor at periodic intervals defined by a crank rotation;
    calculating an engine acceleration of the internal combustion engine based at least in part on the engine speed;
    generating, using a filter, a filtered engine acceleration of the internal combustion engine for the periodic intervals based at least in part on the engine acceleration;
    calculating a root mean square (RMS) engine acceleration of the internal combustion engine based at least in part on the filtered engine acceleration for the periodic intervals, wherein the RMS engine acceleration is calculated using the following equation:

$$\text{mod}\left(\frac{B_0 a_k + B_1 a_k + B_2 a_{k-2} + B_3 a_{k-3} + A_1 a'_{k-1} + A_2 a'_{k-2} + A_3 a'_{k-3}}{a_0}, \text{crank rotation}\right)$$

where $A_0 \ldots A_M$ and $B_0 \ldots B_N$ are coefficients that are precalculated for the filter, M and N are integers, $a_k$, $a_{k-1}$, $a_{k-2}$, $a_{k-3}$ are unfiltered acceleration for a current sample and three prior samples, $a'_k$, $a'_{k-1}$, $a'_{k-2}$, $a'_{k-3}$ are filtered acceleration for the current sample and the three prior samples, and k represents an amount of the crank rotation in degrees;
  detecting an engine misfire event of the internal combustion engine based at least in part on the RMS engine acceleration; and
  implementing a corrective action for the vehicle in response to detecting the engine misfire event.

9. The vehicle of claim 8, wherein the filter is a high pass filter.

10. The vehicle of claim 8, wherein the filter is a Butterworth filter.

11. The vehicle of claim 8, wherein detecting the engine misfire event comprises comparing the RMS engine acceleration to a normal fire value.

12. The vehicle of claim 11, wherein the engine misfire event is detected responsive to the RMS engine acceleration being greater than four standard deviations from the normal fire value.

13. The vehicle of claim 8, wherein generating the filtered engine acceleration is performed using a convolution.

14. The vehicle of claim 13, wherein the convolution is defined by the following equation:

$$\frac{y}{x} = \frac{B_0 + B_1 z^{-1} + B_2 z^{-2} + \ldots + B_N z^{-N}}{A_0 + A_1 z^{-1} + A_2 z^{-2} + \ldots + A_M z^{-M}}$$

where $A_0 \ldots A_M$ and $B_0 \ldots B_N$ are coefficients that are precalculated for the filter, M and N are integers, and y and x refer to filtered and unfiltered acceleration, respectively.

15. A computer program product comprising a computer readable storage medium having program instructions embodied therewith, the program instructions executable by at least one processor to cause the at least one processor to perform operations for detecting engine misfire events for an engine of a vehicle, the operations comprising:
calculating an engine speed based at least in part on a crank sensor signal received from a crank sensor of the engine at periodic intervals defined by a crank rotation;
calculating an engine acceleration based at least in part on the engine speed;
generating, using a filter, a filtered engine acceleration for the periodic intervals based at least in part on the engine acceleration;
calculating a root mean square (RMS) engine acceleration based at least in part on the filtered engine acceleration for the periodic intervals, wherein the RMS engine acceleration is calculated using the following equation:

$$\text{mod}\left(\frac{B_0 a_k + B_1 a_k + B_2 a_{k-2} + B_3 a_{k-3} + A_1 a'_{k-1} + A_2 a'_{k-2} + A_3 a'_{k-3}}{a_0},\right.$$

$$\text{crank rotation}\Big)$$

where $A_0 \ldots A_M$ and $B_0 \ldots B_N$ are coefficients that are precalculated for the filter, M and N are integers, $a_k$, $a_{k-1}$, $a_{k-2}$, $a_{k-3}$ are unfiltered acceleration for a current sample and three prior samples, $a'_k$, $a'_{k-1}$, $a'_{k-2}$, $a'_{k-3}$ are filtered acceleration for the current sample and the three prior samples, and k represents an amount of the crank rotation in degrees;

detecting an engine misfire event based at least in part on the RMS engine acceleration; and implementing a corrective action for the vehicle in response to detecting the engine misfire event.

16. The computer program product of claim 15, wherein detecting the engine misfire event comprises comparing the RMS engine acceleration to a normal fire value, wherein the engine misfire event is detected responsive to the RMS engine acceleration being greater than four standard deviations from the normal fire value.

17. The computer program product of claim 15, wherein generating the filtered engine acceleration is performed using a convolution defined by the following equation:

$$\frac{y}{x} = \frac{B_0 + B_1 z^{-1} + B_2 z^{-2} + \ldots + B_N z^{-N}}{A_0 + A_1 z^{-1} + A_2 z^{-2} + \ldots + A_M z^{-M}}$$

where $A_0 \ldots A_M$ and $B_0 \ldots B_N$ are coefficients that are precalculated for the filter, M and N are integers, and y and x refer to filtered and unfiltered acceleration, respectively.

18. The computer program product of claim 15, wherein the filter is a high pass filter.

19. The computer program product of claim 15, wherein the filter is a Butterworth filter.

20. The computer program product of claim 15, wherein the engine speed is an engine speed for a current time, and wherein the engine acceleration is calculated based on the engine speed for the current time, an engine speed for a previous time, and a periodic interval defined by the crank rotation.

\* \* \* \* \*